United States Patent
Field

(10) Patent No.: US 9,398,263 B2
(45) Date of Patent: Jul. 19, 2016

(54) INTERNET PROTOCOL MULTICAST CONTENT DELIVERY

(75) Inventor: Brian E. Field, Evergreen, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 14 days.

(21) Appl. No.: 13/556,325

(22) Filed: Jul. 24, 2012

(65) Prior Publication Data

US 2012/0287929 A1 Nov. 15, 2012

Related U.S. Application Data

(63) Continuation of application No. 12/635,980, filed on Dec. 11, 2009, now Pat. No. 8,254,385.

(51) Int. Cl.
| | |
|---|---|
| *H04N 7/173* | (2011.01) |
| *H04L 29/06* | (2006.01) |
| *H04N 21/239* | (2011.01) |
| *H04N 21/258* | (2011.01) |

(Continued)

(52) U.S. Cl.
CPC .......... *H04N 7/17318* (2013.01); *H04L 12/185* (2013.01); *H04L 63/104* (2013.01); *H04N 21/2396* (2013.01); *H04N 21/25816* (2013.01); *H04N 21/47202* (2013.01); *H04N 21/6125* (2013.01); *H04N 21/6175* (2013.01); *H04N 21/6405* (2013.01); *H04L 12/1836* (2013.01); *H04L 65/4076* (2013.01); *H04L 65/4084* (2013.01)

(58) Field of Classification Search
CPC . H04L 12/2801; H04L 47/10; H04L 12/2856; H04L 12/2859; H04L 29/12216
USPC .......... 370/352, 389, 392; 725/111, 114, 144, 725/151
See application file for complete search history.

(56) References Cited

U.S. PATENT DOCUMENTS 7,701,938 B1 * 4/2010 Bernstein et al. ............. 370/390
2006/0184990 A1 8/2006 Kwak et al.
(Continued)

FOREIGN PATENT DOCUMENTS

EP 1965561 A2 9/2008

OTHER PUBLICATIONS

Office Action in EP10192679.8 dated Jan. 19, 2012.
(Continued)

*Primary Examiner* — Jung Park
(74) *Attorney, Agent, or Firm* — Banner & Witcoff, Ltd.

(57) ABSTRACT

A first device communicates with subscriber devices in an access network. A communication is sent from a subscriber device to the first device requesting that the subscriber device be permitted to join a multicast group associated with data for a desired content. After determining that the subscriber device is authorized to receive that content, the first device sends one or more multicast signaling communications to a second device. The multicast signaling communications instruct the second device to join the requested multicast group and provide an identifier associated with that multicast group. After joining the multicast group and receiving content data packets of that group, the second device encapsulates those received packets in frames according to an access network media access control (MAC) protocol and forwards the MAC frames to the subscriber device. The MAC frames include the identifier provided to the second device by the first device.

20 Claims, 6 Drawing Sheets

(51) Int. Cl.
*H04N 21/472* (2011.01)
*H04N 21/61* (2011.01)
*H04N 21/6405* (2011.01)
*H04L 12/18* (2006.01)

(56) References Cited

U.S. PATENT DOCUMENTS

| | | | |
|---|---|---|---|
| 2006/0225118 A1 | 10/2006 | Rolls et al. | |
| 2008/0209489 A1* | 8/2008 | Joyce et al. | 725/111 |
| 2009/0144544 A1 | 6/2009 | Koo et al. | |
| 2009/0147781 A1* | 6/2009 | Lee et al. | 370/389 |
| 2009/0279701 A1 | 11/2009 | Moisand et al. | |
| 2010/0017833 A1* | 1/2010 | Abramson et al. | 725/111 |
| 2010/0322420 A1* | 12/2010 | Al-Banna et al. | 380/255 |
| 2011/0016499 A1* | 1/2011 | Liu et al. | 725/98 |
| 2011/0107172 A1* | 5/2011 | Chapman et al. | 714/752 |
| 2011/0228775 A1* | 9/2011 | Lee et al. | 370/390 |

OTHER PUBLICATIONS

Internet Engineering Task Force Request for Comment 3810 ("Multicast Listener Discovery Version 2 (MLDv2) for IPv6"), Jun. 2004.

Internet Engineering Task Force Request for Comment 3376 ("Internet Group Management Protocol, Version 3"), Oct. 2002.

Data-Over-Cable Service Interface Specifications (DOCSIS 3.0) MAC and Upper Layer Protocols Interface Specification (CM-SP-MULPIv3.0-I10-090529), May 29, 2009.

European Search Report for EP 10 19 2679 dated Feb. 7, 2011.

European Office Action—EP Appl. 10192679.8—dated Jan. 14, 2016.

* cited by examiner

US 9,398,263 B2

INTERNET PROTOCOL MULTICAST CONTENT DELIVERY

CROSS-REFERENCE TO RELATED APPLICATION

This application is a continuation of U.S. patent application Ser. No. 12/635,980, titled "Internet Protocol Multicast Content Delivery" and filed Dec. 11, 2009, (now U.S. Pat. No. 8,254,385). Application Ser. No. 12/635,980 is incorporated in its entirety by reference herein.

BACKGROUND

An important purpose of many communication networks is delivering data for video and/or audio content to premises of network subscribers. This content may be from programming services that originate from broadcast television networks (e.g., ABC, CBS, NBC), programming services from other commercial providers (e.g., HBO, ESPN), programming services that retransmit content from local over-the-air television stations, video on demand (VOD) services, etc. Although sometimes called "cable television" (CATV), such content delivery may actually involve various types of media and access network technologies, such as fiber optic and/or wireless networks.

The audio and video content that a user associates with a particular CATV "channel" or other programming service is often received at a gateway, Set Top Terminal (STT) or other subscriber device as a collection of separate multicast or unicast digital data streams. Multicast content such as conventional CATV programming may be provided (or at least available) to large numbers of subscribers simultaneously. Typically, many subscriber devices in an access network may be simultaneously receiving numerous multicast data streams in different frequency bands and/or as separate MPEG (Motion Picture Expert Group) transport streams within a particular frequency band. When a user wishes to watch a particular channel, a subscriber device at the user's premises identifies the appropriate data stream(s) for the desired channel. Data from those streams is then demodulated, decoded and otherwise processed so that audio and/or video output can be generated on a television or other end device. Unicast content data (e.g., for VOD programming) is normally addressed to a single subscriber device in response to a specific request from that device.

For a variety of reasons, it is desirable to transmit both unicast and multicast content data to subscriber devices in Internet Protocol (IP) packets. However, implementing end-to-end multicast IP content delivery poses challenges in some types of existing access networks. As but one example, some network operators deliver programming content data, provide high speed data communication and voice over IP (VoIP) telephony, and facilitate other types of communications over networks, such as wireless, fiber optic or cable networks. Once such network, for example, is a hybrid fiber coaxial (HFC) access network that complies with one or more Data Over Cable System Interface Specification (DOCSIS) standards promulgated by Cable Television Laboratories, Inc. (CableLabs®) of Louisville, Colo. In a DOCSIS-compliant access network, data is transmitted to subscribers via a device known as a Cable Modem Termination System (CMTS). However, routing numerous multicast and unicast IP content data streams through a CMTS could be costly and present scaling problems. A possible alternative is to DOCSIS encapsulate multicast content data at a source and deliver that DOCSIS encapsulated data directly to an Edge Quadrature Amplitude Modulation (EQAM) device in an access network. However, this approach requires a content source or other device to have DOCSIS encapsulation capability. This approach also fails to leverage benefits available in a multicast IP content distribution system.

SUMMARY

This Summary is provided to introduce a selection of concepts in a simplified form that are further described below in the Detailed Description. This Summary is not intended to identify key features or essential features.

In at least some embodiments, a first device such as a cable modem termination system (CMTS) communicates with multiple subscriber devices in an access network. When a user at a subscriber premises wishes to receive multicast content, a communication is sent from a subscriber device at the subscriber premises to the first device. The communication requests that the subscriber device be permitted to join a multicast group associated with data for the desired content. After determining that the subscriber device is authorized to receive that content, the first device sends one or more multicast signaling communications to a second device such as an Edge Quadrature Amplitude Modulation device. The multicast signaling communications instruct the second device to join the requested multicast group and provide an identifier associated with that multicast group. After joining the multicast group and receiving content data packets for that group, the second device encapsulates those received packets in frames according to a media access control (MAC) protocol of the access network. The MAC frames, which include the identifier provided to the second device by the first device, are forwarded to the subscriber device. Although various exemplary embodiments are described as employing a CMTS and EQAM devices, these and other embodiments may also be implemented using other types of termination systems and edge devices.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

Some embodiments are described by example of a packet data network using internet protocol (IP) to deliver content data to subscriber devices. As used herein, "content" includes video images, audio sounds and/or other forms of information that can be encoded into data for communication to a subscriber and then decoded so as to be displayed or otherwise conveyed in human-understandable form. Content includes, but is not limited to, television programming and other types of audio and video communications that are simultaneously delivered to numerous individual subscriber locations over one or more access networks. A "service" is a stream of content data (e.g., data packets for a sequence of programming associated with a broadcast entity or other specific source). A "subscriber" is a person, corporation or other entity that has arranged to receive services from and/or exchange other types of communications with a network. Such arrangements typically, though not necessarily, involve a fee. A "subscriber device" is a device located in a subscriber premises, or a mobile device, that communicates across an access network. Some types of subscriber devices (e.g., a Set Top Terminal (STT) or a cable modem (CM)) receive content data from a network and output that data in a form usable by another device (e.g., a television, a computer, a local network router).

Although some embodiments include networks that employ internet protocol ("IP networks"), an IP network is not synonymous with the Internet (with a capital "I," sometimes known as the "public Internet"). Although an IP network may include portions that utilize the public Internet for some links, an IP network could also be a completely private network. Embodiments include networks using one or more different versions of internet protocol (e.g., IPv4 and IPv6). The IPv4 and IPv6 protocols are well-known and described, e.g., in numerous publications available from the Internet Engineering Task Force (IETF).

Figure 1:
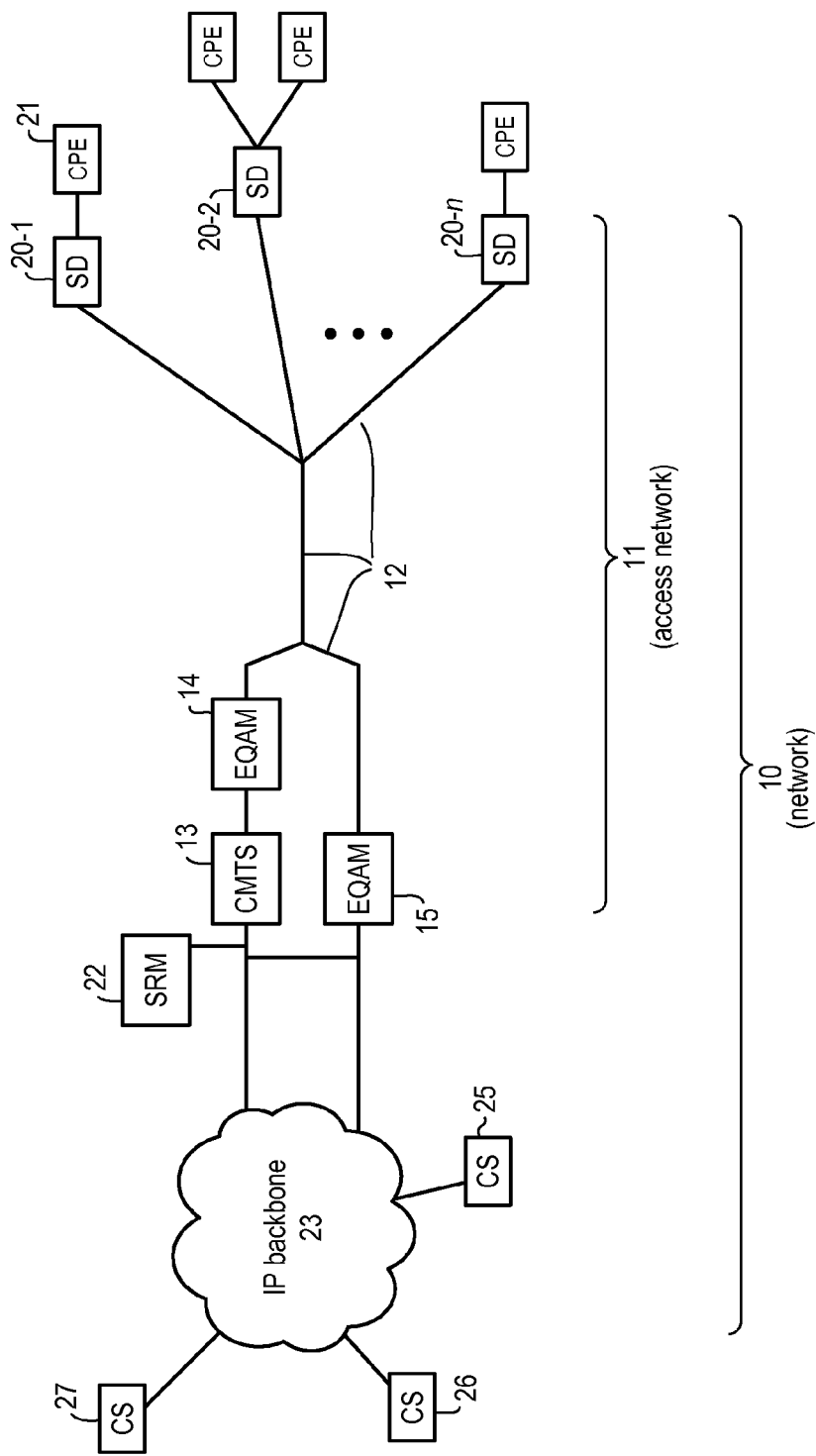
FIG. 1 is a block diagram showing an IP packet data network that includes an access network implementing techniques and devices according to at least some embodiments.

FIG. 1 is a block diagram showing an IP packet data network 10 that includes an access network 11 implementing techniques and devices according to at least some embodiments. The operator of network 10 provides subscribers with high speed data communication (e.g., access to the public Internet) and delivers numerous types of multicast and unicast programming content. Access network 11 is compliant with one or more Data Over Cable System Interface Specification (DOCSIS) standards and includes a plant 12, which may be a hybrid fiber coaxial (HFC) plant 12. Electro/optical nodes, splitters, amplifiers and various other well known network elements are omitted from FIG. 1 for convenience. Access network 11, if it is a cable-type network, may further includes a cable modem termination system (CMTS) 13 that connects access network 11 with the core of IP packet data network 10 and the back office of the operator of network 10. CMTS 13 forwards certain types of data packets between subscriber devices in access network 11 and devices outside of access network 11. In at least some embodiments, unicast data associated with high-speed data access to the public Internet passes through CMTS 13, while multicast data bypass CMTS 13. CMTS 13 also controls use of access network 11 using DOCSIS media access control (MAC) protocols and performs other operations of a conventional DOCSIS CMTS. For example, CMTS 13 encapsulates unicast data packets in DOCSIS MAC frames and forwards those frames to subscriber devices.

Access network 11 further includes a first edge quadrature amplitude modulation (EQAM) device 14 and a second EQAM device 15. EQAM devices 14 and 15 receive data packets and digitally modulate those packets onto downstream RF carriers over HFC plant 12 to multiple subscriber devices 20-1 through 20-n. For purposes of example, "n" is an arbitrary number. Each of subscriber devices 20-1 through 20-n, which could be a Set Top Terminal (STT), cable modem (CM) or other type of device, communicates with one or more customer premises equipment (CPE) devices such as a computer, a local area network router, etc. Subscriber devices also communicate data upstream to CMTS 13 over HFC plant 12. In some embodiments, upstream communications from subscriber devices are received and demodulated at EQAM device 14 and then forwarded to CMTS 13. In other embodiments, upstream subscriber device communications are received directly by and demodulated at CMTS 13. Although only two EQAM devices are shown in FIG. 1, access network 11 could include additional EQAM devices.

Also shown in FIG. 1 are several elements of network 10 located outside of access network 11. For example, and as discussed below, CMTS 13 communicates with a session resource manager (SRM) 22. Apart from SRM 22, FIG. 1 shows network 10 as an IP backbone 23 linked to CMTS 13 and EQAM device 15 of access network 11. The portion of network 10 represented as cloud 23 may include one or more local, regional, national and/or international IP networks. Moreover, network 10 may include multiple additional access networks that are similar to access network 11 and that also operate in a manner such as is described herein.

EQAM device 15 communicates with one or more content sources 25, 26 and 27 via network 10. Content sources may be located within network 10 (e.g., content source 25) or may be external to network 10 (e.g., content sources 26 and 27). In some cases, a content source may be a single server. In other cases, a content source could be a data distribution center controlled by the operator of network 10 or by another entity. One example of a content source could include a regional or national hub where the operator of network 10 receives programming from multiple sources (e.g., cable programming service providers, broadcast networks, local television stations, etc.) via various mechanisms (e.g., satellite downlink, data feed over a separate network, etc.) and then distributes that content to subscribers in network 10. Another example could include a point of presence (POP) maintained by the operator of network 10 in a facility operated by a single cable programming service provider, local television station or broadcast network. Yet another example could be a provider of Pay Per View (PPV) programming Although only three content sources are shown in FIG. 1, this is solely for purposes of example.

In at least some embodiments, content data from sources 25, 26 and 27 and from other sources is distributed in network 10, using IP multicast techniques, to a large number (thousands, hundreds of thousands, or even millions) of individual subscriber devices. For each service, IP data packets containing encoded content data are assigned a corresponding multicast destination IP address. Devices in network 10 can receive data of a particular service by "joining" a group of devices (the "multicast group") to which data having the multicast destination IP address of that service is forwarded. A user at a subscriber premises who wishes to view content of a service provides an appropriate input. In response to that user input, a subscriber device at the subscriber premises sends a request to CMTS 13 that seeks membership in a multicast group corresponding to the desired service. A user input selecting a desired service may be provided to a subscriber device. For example, a user may input a desired CATV channel number into a STT using a remote control. The STT might then generate the appropriate membership request and forward same to CMTS 13. A user input might also be received by a separate CPE device in a local network with a subscriber device. For example, a user may enter an identifier of a desired content into an application program executing on a computer. The computer may then generate the membership request and communicate same to CMTS 13 through a CM subscriber device.

Upon receiving a request from a subscriber device for membership in a multicast group, CMTS 13 determines if an account associated with that subscriber device is authorized to receive the service corresponding to that multicast group. If the account is authorized to receive the service, CMTS 13 instructs EQAM device 15 to join that multicast group. EQAM device 15 then obtains membership in that group so that data packets having the corresponding multicast destination IP address will be forwarded to EQAM device 15 from a content source and/or routers within network 10. CMTS also provides EQAM device 15 and the requesting subscriber device with a multicast identifier corresponding to that multicast group.

After joining a multicast group, EQAM device 15 receives IP data packets having that group's multicast destination IP address and containing content data of the corresponding service. EQAM device 15 encapsulates those received IP packets in frames according to the MAC protocol used in access network 11 and forwards those MAC frames across access network 11. EQAM device 15 includes the multicast identifier received from CMTS 13 in those encapsulating MAC frames. The requesting subscriber device can then filter downstream MAC frames in access network 11 based on the multicast identifier and identify data for the desired content. Additional aspects of content delivery in access network 11 are described below.

Figure 2:
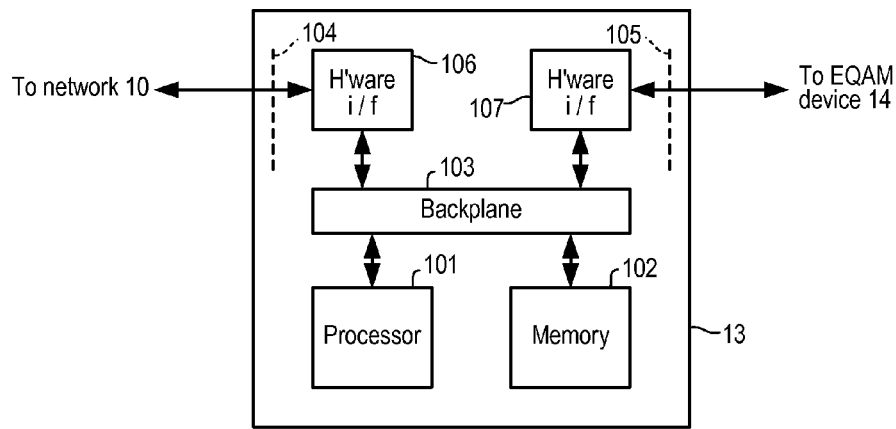
FIG. 2 is a partially schematic block diagram of a CMTS according to at least some embodiments.

FIG. 2 is a partially schematic block diagram of CMTS 13 according to at least some embodiments. A processor 101 executes instructions and controls operation of CMTS 13 so as to carry out operations described herein. CMTS 13 further includes memory 102 storing instructions for execution by processor 101 as well as other data that is stored and/or retrieved by processor 101. Processor 101 accesses memory 102 via one or more data busses in a backplane 103. Although single blocks are shown for processor 101 and for memory 102, memory and computational operations of CMTS 13 could respectively be distributed across multiple memory devices and multiple processors. Accordingly, a reference to "a processor" or to "a memory" encompasses a processor or a memory implemented by multiple discrete components. Memory 102 may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 101 may be implemented with any of numerous types of devices, including but not limited to one or more general purpose microprocessors, one or more application specific integrated circuits, one or more field programmable gate arrays, and combinations thereof. In at least some embodiments, processor 101 carries out operations described herein according to machine readable instructions stored in memory 102 and/or stored as hardwired logic gates within processor 101.

CMTS 13 communicates with SRM 22, EQAM device 15 and other elements of network 10 over a network-side interface 104. CMTS communicates with EQAM device 14 and subscriber devices over an access-side interface 105. Interfaces 104 and 105 may respectively include hardware interface cards 106 and 107 providing physical ports for connection of CMTS 13 to other elements of network 10 and access network 11. Hardware interface cards 106 and 107 could be, e.g., Gigabit Ethernet cards. Processor 101 sends data and instructions to and receives data from interface cards 106 and 107 via backplane 103. In some embodiments, CMTS 13 may include multiple hardware interface cards on network-side interface 104 and/or on access-side interface 105, with hardware switches, buffers and other components interposed between the hardware interface cards and backplane 103. In the embodiment of FIG. 2, it is assumed that CMTS 13 receives upstream communications from subscriber devices over interface 105 via EQAM device 14. In other embodiments, CMTS 13 may include a demodulator and other hardware components so as to receive upstream communications directly from subscriber devices.

In at least some embodiments, CMTS 13 processes certain unicast data traffic in a conventional manner as described by DOCSIS specifications, performs MAC protocol functions as defined in DOCSIS specifications, and performs other conventional CMTS operations. As indicated above and described below, however, multicast data does not flow through CMTS 13. Instead CMTS 13 controls the flow of multicast data through EQAM device 15.

Figure 3:
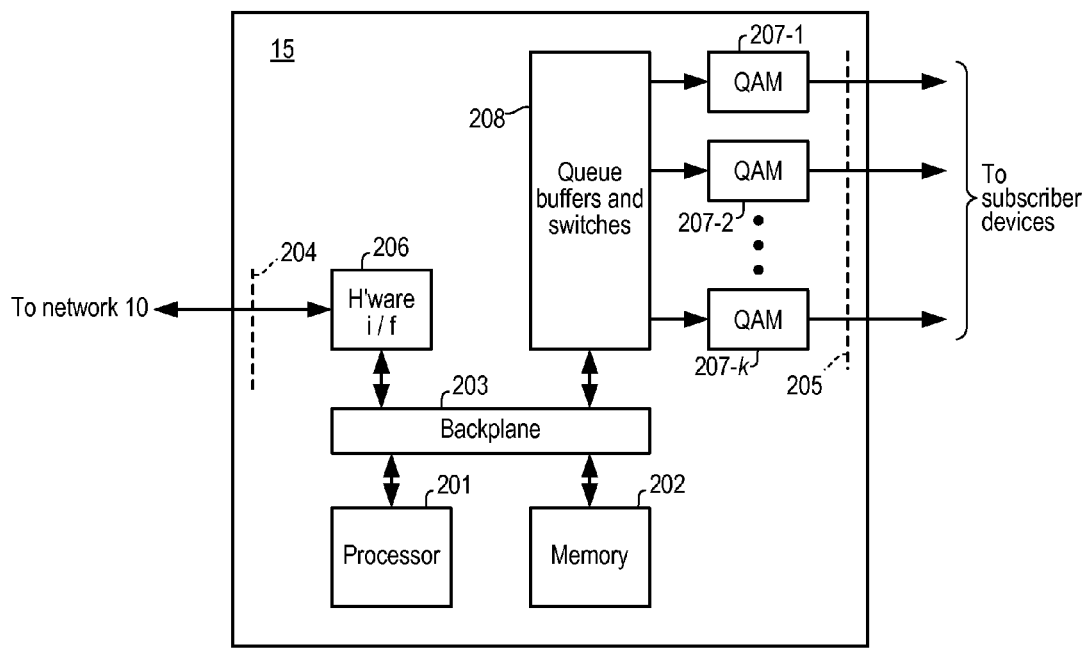
FIG. 3 is a partially schematic block diagram of an EQAM device according to at least some embodiments.

FIG. 3 is a partially schematic block diagram of EQAM device 15 according to at least some embodiments. EQAM device 15 also includes a processor 201 accessing a memory 202 via a back plane 203. Processor 201 executes instructions and controls operation of EQAM device 15 so as to carry out operations described herein. Memory 202 stores instructions for execution by processor 201 as well as other data that is stored and/or retrieved by processor 201. As with CMTS 13, memory and computational operations of EQAM 15 could be distributed across multiple memory devices and multiple processors. Processor 201 and memory 202 could include one or more of the types of processing and memory devices described above for processor 101 and memory 102.

EQAM device 15 receives data from network 10 over a network-side interface 204 that include a hardware interface card 206. Interface card 206 may be, e.g., a Gigabit Ethernet card. Processor 201 sends data and instructions to and receives data and instructions from interface card 206 via backplane 203. In some embodiments, EQAM device 15 could include multiple interface cards on network side-interface 204. EQAM device also receives instructions from CMTS 13 over network-side interface 204.

EQAM device 15 sends data across access network 11 over an access-side interface 205. Located on access-side interface 205 are multiple QAM modulator/upconverters 207-1 through 207-$k$, with k being an arbitrary number. Processor 201 sends data and instructions to QAM modulator/upconverters 207 via back plane 203, through one or more switches and queue buffers represented collectively as box 208. Each of QAM modulator/upconverters 207 is used to transmit over a different portion of the downstream RF spectrum, thereby allowing EQAM device 15 to simultaneously transmit in multiple frequency bands. For example, one group of subscriber devices may be tuned to downstream frequencies A and B, another group tuned to frequencies B and C, another group tuned to frequency D, etc. In addition to transmitting data of multiple groups on different downstream frequencies, EQAM device 15 may also transmit encapsulated data of a single multicast group on multiple downstream frequencies. For example, after joining a particular multicast group and receiving data for that group over interface 204, processor 201 could encapsulate that data into DOCSIS MAC frames, replicate those frames, and then transmit those replicated frames over multiple ones of QAM modulator/upconverters 207-1 through 207-$n$.

Figure 4:
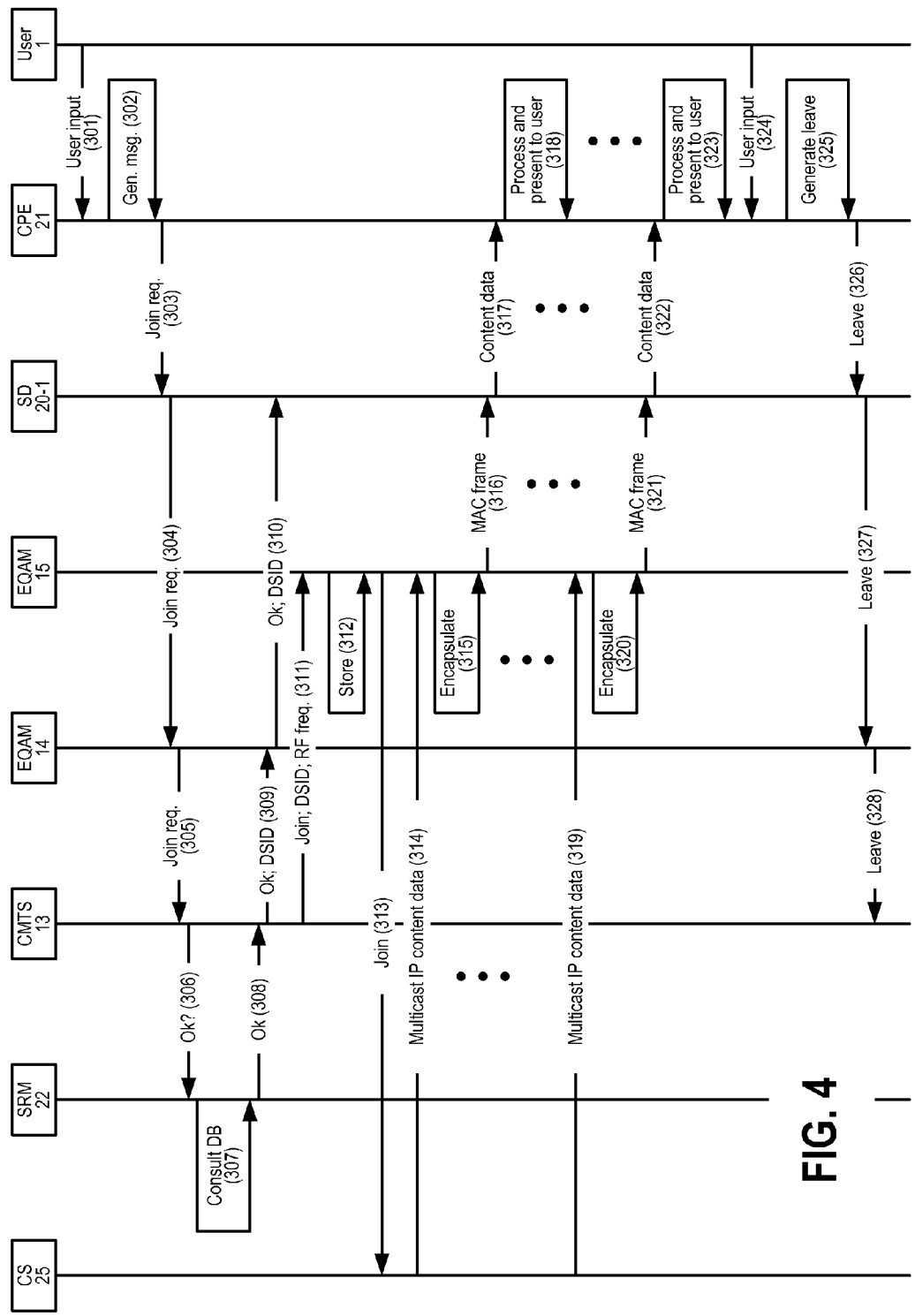
FIG. 4 is an information flow diagram showing communications in an access network according to some embodiments.

Operation of CMTS 13 and EQAM device 15 will now be described in more detail in connection with FIGS. 4-7. FIG. 4 is an information flow diagram showing an example sequence of communications in access network 11. The example of FIG. 4 assumes that CPE device 21 is a computer. FIG. 4 also assumes a user 1 of CPE device 21 wishes to receive a selected audio and/or video content and that the data for that selected content is part of multicast service "A." FIG. 4 further assumes that user 1 is the first user in access network 11 attempting to receive service A. Beginning at line 301, user 1 provides input to CPE device 21 selecting service A. This input could be, e.g., a selection of an icon or typing of a command in a user interface of a web browser or other application program. In response to the input from user 1, CPE device 21 identifies the multicast group corresponding to service A and generates a message requesting membership in that multicast group (line 302). This message could be an IPv4 multicast join request in accordance with Internet Group Membership Protocol (IGMP) (as described, e.g., in IETF Request for Comments (RFC) 3376), an IPv6 a multicast join request in accordance with Multicast Listener Discovery (MLD) protocol (as described, e.g., in IETC RFC 3810), or another type of message identifying the multicast group and requesting multicast data packets of that group. CPE device 21 then sends the membership request to subscriber device 20-1 (line 303), which then transmits the request upstream to CMTS 13 via EQAM device 14 (lines 304 and 305).

In response to receiving the membership request, CMTS 13 determines whether the request should be accepted or rejected. In particular, CMTS 13 communicates with SRM 22 at line 306 and identifies subscriber device 20-1 (and/or the account with which subscriber device 20-1 is associated) and service A (and/or the multicast group for service A). SRM 22 then consults one or more databases and determines if applicable business rules and/or other policies permit subscriber device 20-1 to receive service A (line 307). For example, service A may be programming content associated with a particular broadcast programming provider that is only available to subscribers who have paid an additional fee. Upon determining whether subscriber device 20-1 is permitted to receive service A, SRM 22 communicates with CMTS 13 at line 308 and indicates whether the membership request should be accepted or rejected. In the present example, the communication from SRM 22 at line 308 indicates that the membership request should be accepted.

In response to that communication from SRM 22, CMTS 13 communicates with subscriber device 20-1 at lines 309 and 310 to indicate acceptance the membership request and provide an identifier that will be included in downstream DOCSIS MAC frames that include multicast content data packets of service A. In at least some embodiments, that identifier is a 20-bit Downstream Service Identifier (DSID) that will be included in the Extended Header (EHDR) portion of each downstream DOCSIS MAC frame that encapsulates an IP data packet containing content data of service A. Encapsulation of service A data packets is further described below. The communication to subscriber device 20-1 at lines 309-310 may also include the downstream RF frequency to which subscriber device 20-1 should tune in order to receive service A data.

Also in response to the communication from SRM 22, CMTS 13 sends one or more multicast signaling messages to EQAM device 15 at line 311. The message(s) of line 311 includes the same identifier provided to subscriber device 20-1 at lines 309-310, information identifying the multicast group for service A, and an instruction to EQAM device 15 to join that multicast group. The message(s) to EQAM device 15 also includes the downstream RF frequency on which EQAM device 15 should transmit service A data, and may include additional DOCSIS data for inclusion on a DOCSIS MAC frame or to be otherwise used by EQAM device 15 when transmitting downstream communications to subscriber device 20-1. The specifics of such additional DOCSIS data that might be provided to EQAM device 15 by CMTS 13 would be understood by persons of ordinary skill in the art in view of the description provided herein.

In response to the message(s) from CMTS 13, EQAM device 15 stores the received identifier, the received multicast group identifier, and the received downstream RF frequency over which service data is to be transmitted (line 312). At line 313 EQAM device 15 sends a request to join that multicast group, over network-side interface 204 (see FIG. 3), to the appropriate location(s). In at least some embodiments using IPv4, EQAM device 15 sends an IGMP multicast join request. In at least some embodiments using IPv6, EQAM device sends a MLD join request. For simplicity, FIG. 4 shows the join request of line 313 going to content source 25 that provides service A. However, the join request from EQAM device 15 may be sent via one or more intervening routers and other elements of network 10 and/or of other network(s) connecting EQAM device 15 with a content source.

In response to its join request, and as shown by line 314, EQAM device 15 begins receiving multicast IP data packets containing service A content data. In some cases, EQAM device 15 may have already been receiving service A multicast packets. For example, EQAM device 15 and another EQAM device might both receive data from the same port of an upstream router in network 10. If that other EQAM device had previously joined the service A multicast group, the router may already be forwarding service A multicast data packets on that port. Until EQAM device 15 joins the service A multicast group, however, EQAM device 15 will ignore any service A data packets that it might receive.

Figure 5:
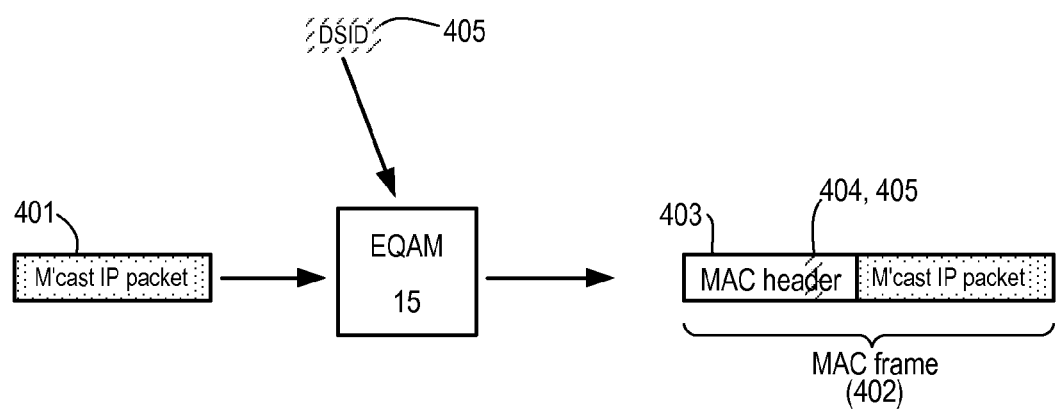
FIG. 5 is a diagram showing encapsulation of multicast content data in a DOCSIS MAC frame by an EQAM device according to some embodiments.

After joining the service A multicast group, EQAM device 15 encapsulates received service A data packets in DOCSIS MAC frames (line 315). EQAM device 15 then QAM modulates and upconverts those frames and transmits them into access network 11 on the RF frequency also provided by CMTS 13 (line 316). FIG. 5 is a diagram showing an example of encapsulation of multicast content data in a DOCSIS MAC frame by EQAM device 15. A multicast IP data packet 401 having service A content data is received across network interface 204 by EQAM device 15. That data packet is encapsulated into a DOCSIS MAC frame 402. The format of a DOCSIS MAC frame is well known and defined by DOCSIS standards. MAC frame 402 includes a header 403, which in turn includes an EHDR field 404. The DSID 405 for service A, previously received by EQAM device 15 from CMTS 13, is inserted into EHDR field 404 by EQAM device 15.

Returning to FIG. 4, MAC frames encapsulating service A data packets are received by subscriber device 20-1, which then strips the MAC frame encapsulation and forwards the service A data packet to CPE 21 (line 317). CPE 21 then processes the service A data and presents it to user 1 (line 318). As indicated by the vertical ellipses and lines 319 through 323, communications similar to those of lines 314 through 318 continue until user 1 indicates a desire to stop receiving service A. At line 324, user 1 provides input to CPE device 21 indicating that service A is no longer desired. In response, CPE device 21 generates a "leave" message indicating that CPE device 21 wishes to leave the service A multicast group (line 325), which message is sent to subscriber device 20-1 (line 326), which then sends the message via EQAM device 14 to CMTS 13 (lines 327-328). Although not shown in FIG. 4, the leave message might also be further propagated into network 10 by CMTS 13. Upon sending the leave message, subscriber device 20-1 simply stops searching for incoming service A data packets. Upon receiving the leave message from subscriber device 20-1, and as discussed in more detail below, CMTS 13 may perform different operations depending on whether other subscriber devices in access network 11 are currently members of the service A multicast group.

Figure 6:
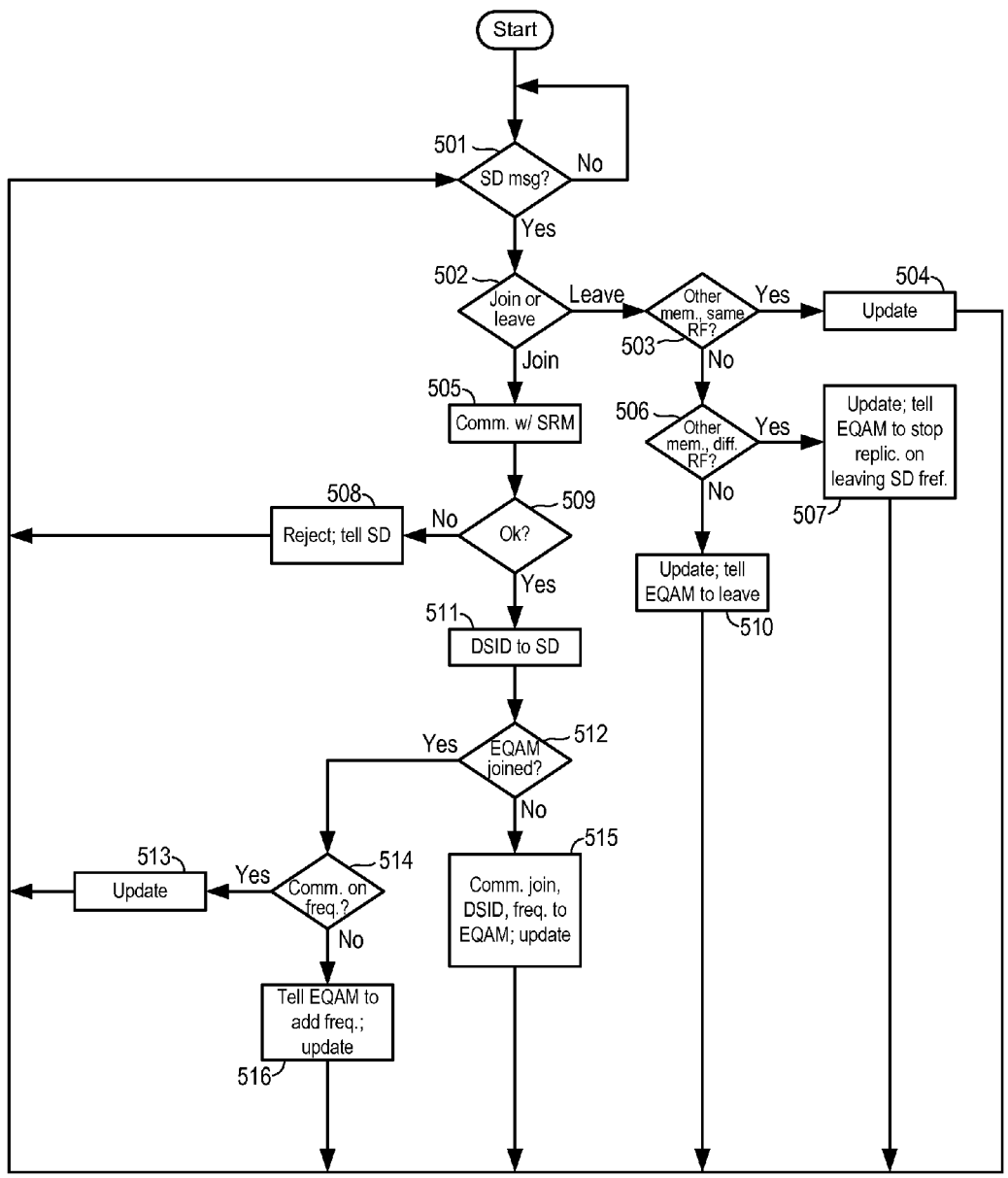
FIG. 6 is a flow chart showing operations performed by a CMTS according to some embodiments.

FIG. 6 is a flow chart for an algorithm performed by CMTS 13 according to at least some embodiments. The algorithm of FIG. 6 is carried out by processor 101 of CMTS 13 according to instructions stored in memory 102 as executable code and/or according to hardwired logic instructions within processor 101. As can be appreciated from FIG. 6 and the following description, processor 101 carries out the algorithm of FIG. 6 in multiple iterations, with each iteration beginning on a transition from box 501 on the "yes" branch and ending on the next return to box 501 from any of boxes 508, 513, 516, 515, 510, 507 or 504. Unless specified otherwise, the following description relates to alternative actions that might occur during a single iteration. For convenience, the description of FIG. 6 refers to the received message initiating the current iteration as the "current subscriber message." The subscriber device that sent that message is the "current subscriber device," and a multicast group to which that message pertains is the "current multicast group."

After starting, CMTS 13 determines at block 501 if there is newly received "join" message or a newly received "leave" message from a subscriber device. A join message requests membership in a multicast group. A leave message indicates a subscriber device is leaving a previously joined multicast group and no longer wishes to receive data corresponding to that group. If no join or leave message has been received, CMTS 13 returns to block 501 on the "no" branch. If a join or leave message is received, CMTS 13 proceeds on the "yes" branch to block 502 to process the current subscriber message. If the current subscriber message is a leave message, CMTS 13 proceeds on the "leave" branch to block 503. Block 503 and other blocks on the "leave" branch from block 502 are discussed below. If the current subscriber message is a join message, CMTS 13 proceeds on the "join" branch from block 502 to block 505.

In block 505, CMTS 13 communicates with SRM 22 to determine if the current subscriber device is permitted to join the current multicast group. As indicated in connection with line 306 of FIG. 4, this communication to SRM 22 identifies the current subscriber device and/or the account associated with the current subscriber device, as well as the current multicast group and/or the service corresponding to the current multicast group. CMTS 13 then awaits a response from SRM 22. Upon receiving that response, CMTS 13 determines at block 509 if the current subscriber message join request has been approved or rejected. If the response from SRM 22 rejects that join request (e.g., if the current subscriber device seeks to receive a service for which an associated subscriber has not paid), CMTS 13 proceeds on the "no" branch to block 508. In block 508, CMTS 13 sends a message to the current subscriber device indicating that the join request will not be processed. CMTS 13 then returns to block 501. If the response from SRM 22 allows the request to join the current multicast group, however, CMTS 13 proceeds on the "yes" branch from block 509 to block 511.

In block 511, and as shown by lines 309-310 of FIG. 4, CMTS 13 sends one or more messages to the current subscriber device indicating that the join request will be processed and providing an identifier for frames that will include data packets of the current multicast group. In at least some embodiments, and as described above, that identifier is a DSID value that will be included in MAC frames encapsulating IP packets of the current multicast group. The message to the current subscriber device also includes the downstream RF frequency over which the service data associated with the current multicast group will be transmitted. The manner in which CMTS 13 chooses the downstream frequency is not relevant to the embodiments described herein and can be performed according to any desired access network management scheme. As part of block 511, CMTS 13 also updates memory 102 to reflect the downstream RF frequency over which the service data associated with the current multicast group will be transmitted to the current subscriber device.

CMTS 13 then proceeds to block 512 and determines if the current multicast group has already been joined by EQAM device 15. For example, another subscriber device may have previously requested membership in the current multicast group in an earlier algorithm iteration, in response to which CMTS 13 may have previously caused EQAM device 15 to join the current multicast group. If CMTS 13 determines in block 512 that EQAM device 15 is not already joined to the current multicast group, CMTS 13 proceeds on the "no" branch to block 515. CMTS 13 then communicates one or more multicast signaling messages to EQAM device 15, as discussed in connection with line 311 of FIG. 4, to provide the DSID provided to the current subscriber device at block 511, to instruct EQAM device 15 to join the current multicast group, and to provide the downstream RF frequency over which EQAM device 15 is to transmit encapsulated data packets after joining the current multicast group. As part of block 515, CMTS 13 also updates data in memory 102 (FIG. 2) to reflect that EQAM device 15 is joined to the current multicast group and that the current subscriber device is joined to the current multicast group. From block 515, CMTS 13 returns to block 501.

If in block 512 CMTS 13 determines EQAM device 15 is already joined to the current multicast group, CMTS 13 proceeds on the "yes" branch. CMTS 13 then determines in block 514 if EQAM device 15 is already transmitting data of the current multicast group over the RF frequency provided to the current subscriber device in block 511. If so, CMTS 13 proceeds on the "yes" branch to block 513 and updates data in memory 102 (FIG. 2) to reflect that the current subscriber device is joined to the current multicast group. CMTS 13 then returns to block 501 without sending additional communications to EQAM device 15. If CMTS 13 determines in block 514 that EQAM device 15 is not already transmitting data of the current multicast group over the RF frequency provided to the current subscriber device in block 511, CMTS 13 proceeds on the "no" branch. In block 516, CMTS 13 then communicates one or more multicast signaling messages instructing EQAM device 15 to begin transmitting data of the current multicast group over that RF frequency. CMTS 13 also updates data in memory 102 to reflect that the current subscriber device is joined to the current multicast group. CMTS 13 returns from block 516 to block 501.

If in block 502 CMTS 13 determines that the current subscriber message is a leave message, the algorithm instead proceeds on the "leave" branch to block 503. CMTS 13 then determines in block 503 if there are other subscriber devices in access network 11 that are also members of the current multicast group and for which EQAM device 15 is sending data of the current multicast group using the same RF frequency over which EQAM device 15 is sending that data to the current subscriber device. If so, CMTS 13 proceeds to block 504 on the "yes" branch and updates data in memory 102 to reflect that the current subscriber device is no longer a member of the current multicast group. Because other subscriber devices are still members of that group and receiving the corresponding service data over the same frequency, however, CMTS 13 proceeds from block 504 to block 501 without communicating with EQAM device 15.

If CMTS 13 determines in block 503 that there are no other subscriber devices in access network 11 that are also members of the current multicast group, or if CMTS 13 determines that EQAM device 15 is not sending data of the current multicast group to other members of the current multicast group using the same RF frequency over which EQAM device 15 has been sending that data to the current subscriber device, CMTS 13 proceeds on the "no" branch to block 506. If CMTS 13 determines in block 506 that there are other subscriber device members of the current multicast group, CMTS 13 proceeds to block 507 and sends one or more multicast signaling messages instructing EQAM device 15 to stop sending current multicast group data over the RF frequency used to send that data to the current subscriber device. CMTS 13 also updates data in memory 102 indicating that the current subscriber device is no longer a member of the current multicast group and that EQAM device 15 is no longer sending data for the current multicast group over the RF frequency that was used to send that data to the current subscriber device. CMTS 13 then returns to block 501 from block 507.

If in block 506 CMTS 13 determines that there are no other subscriber devices in access network 11 that are members of the current multicast group, CMTS 13 proceeds to block 510 and sends one or more multicast signaling messages instructing EQAM device 15 to leave the current multicast group (and by implication, to stop sending current multicast group data into access network 11). CMTS 13 then updates data in memory 102 indicating that no subscriber devices are members of the current multicast group and returns to block 501.

Although not shown in FIG. 6, CMTS 13 may in some circumstances reallocate downstream RF frequencies and change one or more RF frequencies over which EQAM device 13 is already sending multicast group data to one or more subscriber devices. In such circumstances, CMTS 13 sends appropriate signaling messages to the affected subscriber devices providing new RF frequencies and one or more messages to EQAM device 15 providing the new frequency allocation(s).

Figure 7:
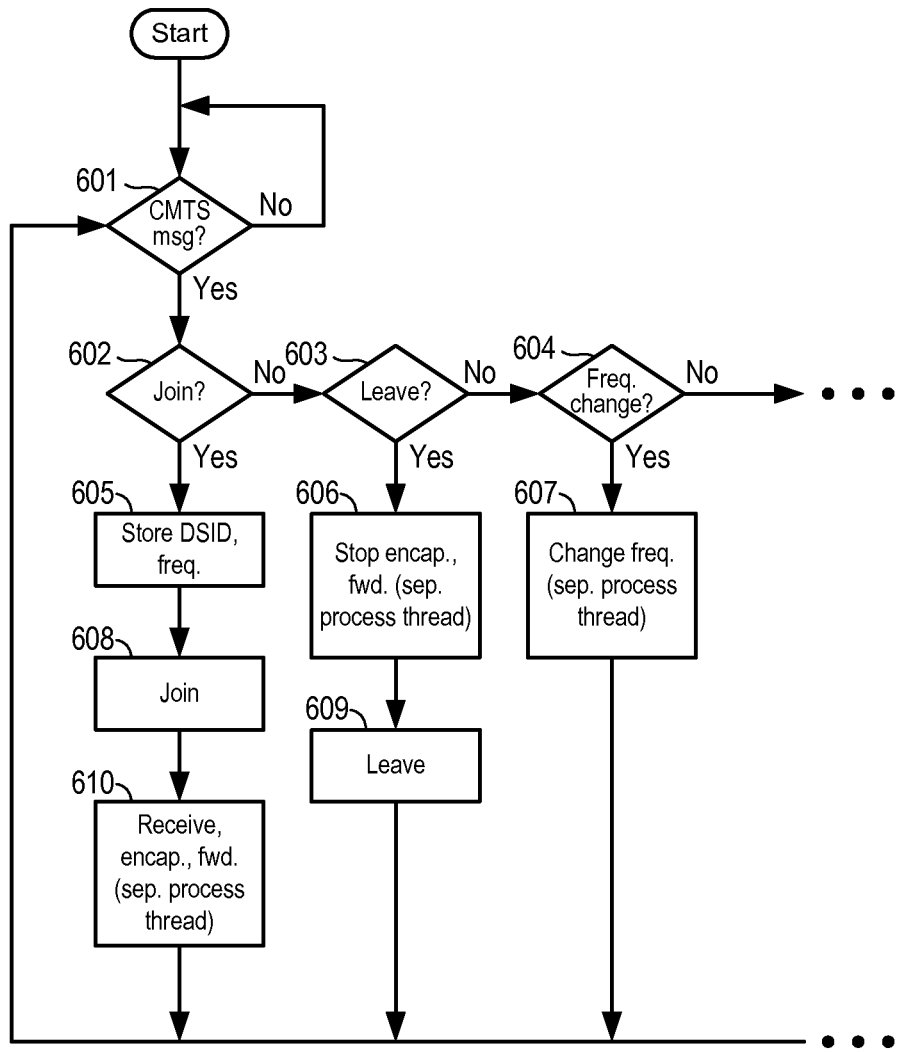
FIG. 7 is a flow chart showing operations performed by an EQAM device according to some embodiments.

FIG. 7 is a flow chart for an algorithm performed by EQAM device 15 according to at least some embodiments. The algorithm of FIG. 7 is carried out by processor 201 of EQAM device 15 according to instructions stored in memory 202 as executable code and/or according to hardwired logic instructions within processor 201. In block 601, EQAM device 15 determines if it has received a message from CMTS 13. If not, the algorithm returns to block 601 on the "no" branch. If a CMTS message has been received, the algorithm proceeds to block 602 on the "yes" branch. In block 602, EQAM device 15 determines if the received message is an instruction to join a multicast group. If so, the algorithm proceeds to block 605, where EQAM device 15 stores a DSID and RF frequency from the received message in memory 202 (FIG. 3). EQAM device 15 then proceeds to block 608 and sends a message across network-side interface 204 requesting membership in the multicast group identified in the received message. EQAM device 15 then proceeds to block 610 and initiates operations on one or more separate process threads to encapsulate data for the joined multicast group in DOCSIS MAC frames (using the DSID just stored in block 605) and to forward those MAC frames over access-side interface 205 on the RF frequency also stored in block 605. From block 610, the algorithm returns to block 601.

If in block 602 EQAM device 15 determines that the received message is not an instruction to join a multicast group, the algorithm proceeds on the "no" branch to block 603. EQAM device 15 then determines if the just-received message is an instruction to leave a multicast group. If so, EQAM device 15 proceeds on the "yes" branch to block 606 and terminates the separate process thread(s) that are encapsulating data for that multicast group and sending encapsulated data into access network 11. EQAM device 15 then proceeds to block 609 and sends a message across network-side interface 204 leaving the multicast group. From block 609, the algorithm returns to block 601.

If in block 603 EQAM device 15 determines that the just-received message is not an instruction to leave a multicast group, the algorithm proceeds to block 604 on the "no" branch. In block 604, EQAM device 15 determines if the just received message is an instruction to stop sending MAC frames encapsulating data for a particular multicast group over a particular downstream RF frequency and/or to start sending such frames on a new downstream frequency. If so, EQAM device 15 proceeds to block 607. If the received CMTS communication is an instruction to begin sending data of a previously joined multicast group on a new downstream frequency, EQAM device 15 will cause one or more separate process threads to begin replicating MAC frames encapsulating that multicast group data and transmitting those frames using the QAM modulator/upconverter that transmits on that new frequency. If the received CMTS communication is an instruction to stop sending data of a previously joined group using a particular downstream frequency, EQAM device 15 will cause the appropriate process thread(s) to stop replicating and transmitting MAC frames having data of that group over the QAM modulator/upconverter corresponding to that particular frequency. The algorithm returns to block 601 from block 607.

If in block 604 EQAM device 15 determines the just-received message is not an instruction to stop or start sending encapsulated multicast data over a particular RF frequency, the algorithm proceeds on the "no" branch. As shown in FIG. 7 by an ellipsis on the "no" branch from block 604 and a corresponding ellipsis on the return branch to block 601, one or more additional sets of decision and operation blocks can follow block 604 for other possible actions by EQAM device 15.

As indicated above, various embodiments can be implemented in networks having DOCSIS-compliant HFC access networks. However, other embodiments include non-DOCSIS non-HFC access networks. Examples of such other access networks include access networks that use satellite delivery. Although the foregoing exemplary embodiments have been described as employing a CMTS and EQAM devices, these and other embodiments may also be implemented using other types of termination systems and edge devices.

Embodiments of the invention include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a network device to carry out operations such as are described herein. As used herein (including the claims), a machine-readable storage medium is a physical structure that can be touched by a human. A modulated signal would not by itself constitute a machine-readable storage medium.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage media. Any and all permutations of features from the above-described embodiments are the within the scope of the invention. In the claims, terms such as "first," "second," etc. are used to differentiate among features and do not (in the absence of language to the contrary) have temporal significance.

The invention claimed is:

1. A method comprising:
   receiving, by a first computing system, a first request message indicating that a device is requesting membership in a multicast group associated with a service;
   determining to authorize membership in the multicast group based on an indication that the device is permitted to receive the service; and
   conditioned upon determining to authorize membership in the multicast group, transmitting, by the first computing system to a second computing system, an instruction message that instructs the second computing system to transmit a second request message indicating that the second computing system is to join the multicast group and that instructs the second computing system to, responsive to receiving data of the multicast group, transmit the data of the multicast group to the device.

2. The method of claim 1, wherein the first computing system comprises a cable modem termination system (CMTS) that is in communication with the device via an access network, and wherein receiving the first request message comprises receiving the first request message via the access network.

3. The method of claim 2, wherein the CMTS is in communication with a session resource manager (SRM) via an Internet Protocol (IP) network, and wherein the method further comprises:
   receiving, by the CMTS from the SRM via the IP network, the indication that the device is permitted to receive the service.

4. The method of claim 1, wherein the second computing system and the device are in communication with each other via a network, and wherein the method further comprises:
   receiving, by the second computing system, the data of the multicast group in an Internet Protocol (IP) format;
   encapsulating the data of the multicast group in the IP format, resulting in encapsulated data that is in a transmission format required for transmission over the network; and
   transmitting the encapsulated data to the device via the network.

5. The method of claim 4, wherein the encapsulated data comprises one or more media access control (MAC) frames, wherein each of the one or more MAC frames encapsulates a portion of the data of the multicast group in the IP format, and wherein transmitting the encapsulated data to the device via the network comprises transmitting the one or more MAC frames over a quadrature amplitude modulation (QAM) channel.

6. The method of claim 5, wherein the first request message comprises an identifier of the multicast group, and wherein each of the one or more MAC frames comprises the identifier of the multicast group.

7. A method comprising:
   receiving, by a first computing system via a network of a first type, a first request message indicating that a device is requesting membership in a multicast group;
   conditioned upon receiving the first request message, transmitting, by the first computing system to a second computing system, an instruction message that instructs the second computing system to join the multicast group;
   conditioned upon receiving the instruction message, transmitting, by the second computing system, a second request message indicating that the second computing system is requesting membership in the multicast group; and
   responsive to receiving data of the multicast group by the second computing system via a network of a second type, transmitting the data of the multicast group to the device via the network of the first type.

8. The method of claim 7, wherein the network of the first type comprises a Data Over Cable System Interface Specification (DOCSIS) compliant network.

9. The method of claim 8, wherein the network of the second type comprises an Internet Protocol (IP) compliant network.

10. The method of claim 7, further comprising:
    responsive to receiving the data of the multicast group by the second computing system, encapsulating the data of the multicast group into one or more DOCSIS media access control (MAC) frames, wherein each of the one or more DOCSIS MAC frames encapsulates a portion of the data of the multicast group; and
    wherein transmitting the data of the multicast group to the device via the network of the first type comprises transmitting the one or more DOCSIS MAC frames.

11. The method of claim 10, wherein the first request message comprises an identifier of the multicast group, and wherein each of the one or more DOCSIS MAC frames comprises the identifier of the multicast group.

12. The method of claim 10, wherein receiving the data of the multicast group by the second computing system comprises receiving the data of the multicast group in an Internet Protocol (IP) format, and wherein each of the one or more DOCSIS MAC frames encapsulates a portion of the data of the multicast group in the IP format.

13. A method comprising:
    receiving, by a first computing system via a network of a first type, a first request message indicating that a device is requesting membership in a multicast group;
    conditioned upon receiving the first request message, transmitting, by the first computing system to a second computing system, an instruction message that instructs the second computing system to join the multicast group and that comprises a location at which data of the multicast group is to be transmitted to the device;
    conditioned upon receiving the instruction message, transmitting, by the second computing system, a second request message indicating that the second computing system is requesting membership in the multicast group; and responsive to receiving data of the multicast group by the second computing system via a network of a second type, transmitting, at the location, the data of the multicast group to the device via the network of the first type.

14. The method of claim 13, wherein the network of the first type comprises a Data Over Cable System Interface Specification (DOCSIS) compliant network.

15. The method of claim 14, wherein the network of the second type comprises an Internet Protocol (IP) compliant network.

16. The method of claim 13, further comprising:
responsive to receiving the data of the multicast group by the second computing system, encapsulating the data of the multicast group into one or more DOCSIS media access control (MAC) frames, wherein each of the one or more DOCSIS MAC frames encapsulates a portion of the data of the multicast group; and
wherein transmitting, at the location, the data of the multicast group to the device via the network of the first type comprises transmitting the one or more DOCSIS MAC frames.

17. The method of claim 16, wherein the first request message comprises an identifier of the multicast group, and wherein each of the one or more DOCSIS MAC frames comprises the identifier of the multicast group.

18. The method of claim 16, wherein receiving the data of the multicast group by the second computing system comprises receiving the data of the multicast group in an Internet Protocol (IP) format, and wherein each of the one or more DOCSIS MAC frames encapsulates a portion of the data of the multicast group in the IP format.

19. The method of claim 18, wherein the location comprises a radio frequency, and wherein transmitting, at the location, the data of the multicast group to the device via the network of the first type comprises modulating, using quadrature amplitude modulation (QAM), the data of the multicast group over the radio frequency.

20. The method of claim 16, further comprising:
transmitting, from the first computing system to the device, an identifier for the one or more DOCSIS MAC frames.

\* \* \* \* \*